United States Patent [19]

Conrady

[11] Patent Number: 4,478,972

[45] Date of Patent: Oct. 23, 1984

[54] DIELECTRIC HEAT SEALED COATINGS

[75] Inventor: James A. Conrady, Amherst, Ohio

[73] Assignee: The BFGoodrich Company, Akron, Ohio

[21] Appl. No.: 565,312

[22] Filed: Dec. 27, 1983

Related U.S. Application Data

[62] Division of Ser. No. 503,468, Jun. 13, 1983.

[51] Int. Cl.$^3$ ............................................. C08K 5/05
[52] U.S. Cl. .................................. 524/388; 524/424; 524/428; 524/386
[58] Field of Search ................. 524/388, 401, 424, 428

[56] References Cited

U.S. PATENT DOCUMENTS 3,679,703  7/1972  Conrady et al. ................. 260/334 R
4,340,648  7/1982  Conrady et al. .................... 428/518

Primary Examiner—Joseph L. Schofer
Assistant Examiner—J. M. Reddick
Attorney, Agent, or Firm—J. Hughes Powell, Jr.; Alan A. Csontos

[57] ABSTRACT

Methods for preparing articles of manufacture comprising coated vinyl halide polymer surfaces which can be adhered to coated or uncoated vinyl halide surfaces by dielectric heat sealing are disclosed wherein said compositions contain water dispersions of acrylate polymers containing esters of acrylic and methacrylic acid, and optionally, copolymerizable unsaturated carboxylic acids in amounts of less than 10 weight percent of said polymers, and other vinylidene monomers such as unsaturated nitriles and vinyl aromatic monomers, and as essential ingredients, small amounts of ammonium salts and larger amounts of glycerine.

6 Claims, No Drawings

DIELECTRIC HEAT SEALED COATINGS

This is a division of application Ser. No. 503,468 filed June 13, 1983.

BACKGROUND OF THE INVENTION

Inks and coatings can be applied on vinyl halide polymer surfaces such as polyvinyl chloride from organic solvents such as methyl ethyl ketone. These coated surfaces can be heat sealed via dielectric heating to form strong bonds. However, then water based coatings and printing inks are applied to a polyvinyl chloride polymer surface, most such deposits fail to seal under normal dielectric heating conditions. This problem is encountered with coatings and inks based on water dispersions of acrylate polymers. In view of the desirability of using water based coatings and inks, because of higher cost and toxicological problems involved with the usual organic solvents, water based acrylate polymer coatings and inks that are readily dielectric heat sealed are in demand.

PRIOR ART

U.S. Pat. No. 4,340,648 discloses single package water based compositions coated on polyvinyl chloride substrates. These compositions comprise binder resins of ethylenically unsaturated acids of 3 to 10 carbon atoms and acrylic monomers selected from alkyl acrylates and methacrylates containing 4 to 24 carbon atoms, and a scavenging agent selected from alkaline earth metal salts, oxides, hydroxides and alkyl esters. While these coating compositions may be baked after application to the substrate to form satisfactory coatings, these compositions will not seal satisfactorily to other coated or uncoated polyvinyl chloride substrates when heated dielectrically.

U.S. Pat. No. 3,679,703, directed to an unrelated art, Sand Core and Mold compositions. Typical compositions, after baking in an oven or dielectrically, had very poor resistance to humidity and suffered a loss of strength in storage and when contacting wet sand. However, when the sand core or mold compositions contained 0.1 to 5 weight parts of an amine salt of a copolymer polymer of acrylonitrile containing preferably greater than 20 weight percent acrylic acid and small amounts of ammonium salt and glycerine, the resulting sand cores and molds were found to have increased resistance to humidity and moisture after being heated, i.e., baked in an air oven or dielectrically.

SUMMARY OF THE INVENTION

Articles of manufacture comprising coating compositions based on water dispersions of acrylate polymers applied on vinyl halide polymer surfaces can be dielectrically heat sealed when small amounts of glycerine and lesser amounts of ammonium salts are dissolved in the compositions prior to being applied to a vinyl halide polymer surface for dielectric heat sealing.

DETAILED DESCRIPTION

The vinyl halide polymers used in the invention include homopolymers, copolymers and blends of homopolymers and/or copolymers. Useful vinyl halide polymers include vinyl chloride and vinylidene chloride polymers that contain from 0 up to about 50% by weight of at least one other olefinically unsaturated monomer, (i.e., a monomer containing at least one terminal CH2? group per molecule) copolymerized therewith, more preferably up to about 20% by weight of such monomers. Suitable comonomers include olefins containing from 2 to 12 carbon atoms, more preferably from 2 to 8 carbon atoms, such as ethylene, propylene, 1-butene, isobutylene, 1-hexene, 4-methyl-1-pentene, and the like; dienes containing from 4 to 10 carbon atoms including conjugated dienes such as butadiene, isoprene, piperylene, and the like; non-conjugated dienes such as ethylidene norborene and dicyclopentadiene; vinyl esters and allyl esters such as vinyl acetate, vinyl chloroacetate, vinyl propionate, vinyl butyrate, vinyl laurate, vinyl bezoate, allyl acetate, and the like; vinyl aromatics such as styrene, $\alpha$-methyl styrene, chlorostyrene, vinyl toluene, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile, and the like; cyanoalkyl acrylates such as $\alpha$-cyanomethyl acrylate, the $\alpha$-, $\beta$ and $\gamma$-cyanopropyl acrylates and the like; olefinically unsaturated carboxylic acids and esters thereof, including the $\alpha$, $\beta$-olefinically unsaturated acids and esters thereof such as acrylic acid, methacrylic acid, ethacrylic acid, methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethooxyethyl acrylate, hexylthioethyl acrylate, methyl methacrylate, ethyl methacrylate, butyl methacrylate, glycidyl methacrylate and the like wherein the alkyl groups contain 1 to 12 carbon atoms, and including esters of maleic and fumaric acid and the like; amides of the $\alpha$, $\beta$-olefinically unsaturated carboxylic acids such as acrylamide, methacrylamide, and the like; divinyls, diacrylates and other polyfunctional monomers such as divinyl benzene, divinyl ether, diethlene glycol diacrylate, ethylene glycol dimethacrylate, methylene-bis-acrylamide, allyl pentaerythritol, and the like; and bis($\beta$-haloalkyl) alkenyl phosphonates such as bis($\beta$-chloroethyl vinyl phosphonate and the like.

A group of particularly useful conomomers used with vinyl chloride include 1-olefins containing from 2 to 8 carbon atoms; vinyl esters such as vinyl acetate; olefinically unsaturated carboxylic acids and esters thereof, especially acrylic, methacrylic and maleic acid and esters thereof; esters of maleic and fumaric acid and the like; amides of $\alpha$, $\beta$-olefinically unsaturated carboxylic acids; and vinylidene chloride. The term vinyl chloride polymer includes chlorinated and chlorosulfonated derivatives of the vinyl chloride polymers described hereinabove. These vinyl chloride polymers normally are high molecular weight polymers having specific viscosity greater than 0.2 measured as a 0.4% solution in nitrobenzene.

The acrylate polymers contemplated include both homo- and copolymers of acrylate ester monomers of acrylic acid and methacrylic acid represented by the formula

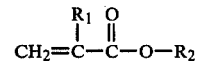

wherein $R_2$ is an alkyl radical group having from 1 to 30 carbon atoms, preferably 1 to 20 carbon atoms and $R_1$ is hydrogen, methyl or ethyl.

Representative acrylates include methyl acrylate, ethyl acrylate, propyl acrylate, isopropyl acrylate, butyl acrylate, isobutyl acrylate, methyl methacrylate, methyl ethacrylate, ethyl methacrylate, octyl acrylate, heptyl acrylate, octyl methacrylate, isopropyl methacrylate, 2-ethylhexyl acrylate, nonyl acrylate, hexyl acrylate, n-nexyl methacrylate, and the like; higher alkyl acrylic esters are decyl acrylate, isodecyl methacrylate, lauryl acrylate, strearyl acrylate, behenyl acrylate and melissyl acrylate and the corresponding methacrylates such as lauryl and stearyl methacrylate. Mixtures of two or three or more acrylic esters may be used. The amounts used will be from 100 weight percent of the monomers being polymerized, to greater than 60 weight percent, of the monomers being copolymerized. Preferably the amount of acrylate esters is greater than 75 weight percent.

The carboxylic monomers used in the production of polymers of this invention are the olefinically-unsaturated carboxylic acids containing at least one activated carbon-to-carbon olefinic double bond, and at least one carboxyl group; that is, an acid containing an olefinic double bond which readily functions in polymerization because of its presence in the monomer molecule, either in the alpha-beta position with respect to a carboxyl group, —C=C—COOH; or as a part of a terminal methylene grouping $CH_2$=C<. Olefinically-unsaturated acids of this class include such materials as the acrylic acids typified by the acrylic acid itself, methacrylic acid, ethacrylic acid, alpha-chloro-acrylic acid, alpha-cyano acrylic acid, beta-methylacrylic acid (crotonic acid), alpha-phenyl acrylic acid, beta-acryloxy propionic acid, sorbic acid, alphachlorosorbic acid, angelic acid, cinnamic acid, p-chlorocinnamic acid, beta-styryl acid (1-carboxy-4-phenyl butadiene-1,3), itaconic acid, citraconic acid, mesaconic acid, glutaconic acid, aconitic acid, maleic acid, fumaric acid, and tricarboxy ethylene. As used herein, the term "carboxylic acid" includes the polycarboxylic acids and those acid anhydrides, such as maleic anhydride, wherein the anhydride group is formed by the elimination of one molecule of water from two carboxyl groups located on the same polycarboxylic acid molecule. Maleic anhydride and other acid anhydrides useful herein have the general structure

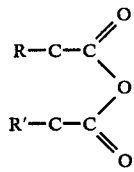

wherein R and R' are selected from the group consisting of hydrogen, halogen and cyanogen (—C≡N) groups and alkyl, aryl, alkaryl, aralkyl, and cycloalkyl groups such as methyl, ethyl, propyl, octyl, decyl, phenyl, tolyl, xylyl, benzyl, cyclohexyl, and the like.

The preferred carboxylic monomers for use are acrylic acid, methacrylic acid, itaconic, maleic and fumaric acids or the anhydrides thereof. The amount of acid will be from 0 to less than 15 weight percent of the total monomers being copolymerized, normally about 2 to 8 weight percent.

Other vinylidene monomers that may be used with the acrylate esters include the acrylic nitriles, α, β-olefinically unsaturated nitriles, preferably the monoolefinically unsaturated nitriles having from 3 to 10 carbon atoms such as acrylonitrile, methacrylonitrle, ethacrylonitrile, chloroacrylonitile, and the like. Most preferred are acrylonotrile and methacrylonitrile. Also vinyl aromatics such as styrene, 2-methyl styrene, chlorostyrene, olkoxystyrene, vinyl touene, ethyl styrene, vinyl naphthalene and the like may be used. The amounts used are, for example, for some polymers are form about 0 to 25 weight percent of the total monomers copolymerized.

The acrylate polymers are readily prepared by standard polymerization techniques known to those skilled in the art. The monomers may be polymerized in water with conventional free radical forming catalysts such as peroxides, potassium persulfate, ammonium persulfate, redox catalyst systems and the like; with or without molecular weight modifiers such as mercaptans, buffers and surface active agents as desired. These polymerizations normally proceed quite rapidly at reaction temperatures from about 50° to 100° C. with the persulfates, and at lower temperatures with redox type catalyst system. The monomers are normally proportioned into the polymerization vessel over a period of time to control the reaction rate. The concentration of polymer in the water dispersion may be as low as one wishes, but more economically is at least 20 weight percent and may be as high as about 60 weight percent. A range of about 35 to 50 weight percent polymer in the aqueous dispersion is preferred. While not as satisfactory because of cost, the polymers may be prepared in solvents and redispersed in water, neutralized and used as described. The acrylate polymers normally have a Tg value in the range of about 20° C. to 70° C.

The acrylate polymers, as used in the coating compositions of this invention should be at least neutral, i.e., pH7, and up to a pH of 12, preferably they will have a pH in water of above about 7.0 to about 9. These pH values are obtained by treating a water dispersion of the acrylate polymer with suitable alkaline neutralizing agents. Typical of suitable neutralizing agents are water solutions of ammonium hydroxide, sodium hydroxide, potassium hydroxide; and amines such as triethyl amine, dimethylamino ethanol, triethanol amine, and the like.

Use of an ammonium salt and glycerine are required to realize the advantages of this invention. The ammonium salt may be any salt of ammonia, including, for example, ammonium acetate, ammonium bromate, ammonium bromide, ammonium carbonate, ammonium chloride, ammonium citrate, ammonium formate, ammonium iodide, ammonium oxalate, ammonium nitrate, ammonium sulfate, and the like. Excellent results have been obtained with ammonium carbonate. The amounts of ammonium salt used are small. Based on 100 weight parts of acrylate polymer, there will normally be used from about 0.005 to about three weight parts, more usually, about 0.05 to about 2 weight parts of ammonium salt. Larger amounts of glycerine are used in relation to the amount of ammonium salt. Usually the weight ratio of glycerine to ammonium salt will be from about 2 to 1 to about 25 or more to 1 of glycerine to ammonium salt, more usually, about 5 to 1 to about 15 to 1. Good results have been obtained with about 0.1 to about 0.3 weight parts of ammonium salt and about 0.5 to about 3 weight parts of glycerine.

The coatings of this invention contain as an essential and primary ingredient the acrylate ester polymers described and defined hereinabove. A clear coating, for example, may contain a water dispersion of the acrylate polymer, a small amount of a silica flatting agent, butyl Cellosolve (butoxy ethanol or ethylene glycol monobutyl ether), a cross-linking agent if desired, the ammonium salt and glycerine. After such coating is deposited on a polyvinyl chloride film surface and dried or baked, it is readily sealed to another coated or uncoated PVC surface via dielectric heating. Pigments may be added in the coating for color. To make an ink, one may add to the compositions a pigment dispersion in amount and type to obtain the desired color and intensity. The preparation of coating compositions including inks, is well known to those skilled in the art and is fully described in the literature.

As an example of the preparation of the simple coating composition described above, a water dispersion of an acrylic acid containing acrylate polymer was neutralized with dimethylaminoethanol to a pH of about 8. The silica flatting agent was dispersed in the polymer solution by a low sheer marine propeller, butyl Cellosolve added, and water, to reduce viscosity, if needed.

Silica flatting agents are available commercially from a variety of sources. These silicas are amorphous rather than being crystalline and as supplied may vary only in the size and distribution of agglomerates, and will range in size from about 1 to about 25 microns average.

Coating compositions often contain small amounts of solvents to promote wetting of the plastic surface. Typical of the materials used are the mono- and dialkyl ethers of ethylene glycol such as ethylene glycol monobutyl ether (butyl "Cellosolve"), ethylene glycol monobutyl ether acetate, ethylene glycol monoethyl ether, ethylene glycol dibutyl ether, ethylene glycol monomethyl ether acetate, and the like; and the mono- and dialkyl ethers of diethylene glycol including diethylene glycol monobutyl ether (butyl Carbitol), diethylene glycol monbutyl ether acetate, diethylene ethylene glycol monoethyl ether, diethylene glycol dibutyl ether, diethylene glycol monohexy ether, and the like.

In addition to pigment dispersions added for ink composition, other standard compounding ingredients known to those skilled in the art may be added. In the case of printing inks, lubricants such as waxes, stearates, silicones and the like may be added. Stabilizers and antioxidants, particularly ultraviolet stabilizers, fungicides, mildewicides, anti-freeze and anti-foaming agents and the like all may be used as desired.

While the amounts of ingredients added to the acrylate polymer coating compositions of this invention may be varied widely in accordance with the needs of those skilled in the art, if a solvent is used, the amount normally well be from about 2 to 100 weight parts per 100 weight parts of acrylate ester polymer; in inks, the amount of pigments may be from about 5 to about 50 weight parts per 100 weight parts of acrylate polymer, more usually about 10 to 20 weight parts; and if a silica flatting agent is used, from about 5 to 50 weight parts per 100 weight parts of polymer.

The techniques and procedures for using dielectric heating for sealing plastics are well known. Plastic welding and and sealing are normally done at a frequency in the range of about 15 to 30 Megahertz. The power requirements in kilowatts are readily determined by a simple formula:

$$kw = \frac{lb/hr \times \text{specific heat} \times \text{temperature rise (°F.)}}{3413}$$

Plastic sealers are produced in output power ranges of from 1 kw up. Power requirements depend on the square inches of seal (compact dies), linear inches of seal (if a long and narrow seal), thickness of material and type of material. Some commercial presses are 40 or 50 kilowatt units operating at a frequency between 18 and 24 Megahertz.

Specific embodiments of the invention are set forth in the following Examples.

EXAMPLE 1

A printing ink formulation was prepared by first neutralizing a 37.5 weight percent water solution of a copolymer of 33 weight percent ethyl acrylate, 63 weight percent methyl methacrylate, and 4 weight percent acrylic acid, having a molecular weight of 25,000 and a Tg value of 55° C., with dimethylethanolamine to a pH of 7.8. To 240 weight parts of this water dispersion of the polymer, there was mixed in 20 weight parts of silica flatting agent, 24 weight parts of ethylene glycol monobutyl ether, 8.5 weight parts of Acrysol TT-678 lubricant, and 10 weight parts of a 45% total solids aqueous dispersion of lead chromate pigment, and enough water to obtain a Zahn #3 cup viscosity of about 35. 4.8 weight parts of crosslinking agent CX-100 ( a polyfunctional aziridine having a aziridine functionality of 2.24 and sp. gr. 1.05) was then added to the composition. The printing ink was pad printed on a polyvinyl chloride pool liner stock with a rotagravure hand proofer, and baked at 82° C. for 1 minute. Two pieces of the coated PVC stock were then placed face to face in a dielectric oven. There was no seal of the coated surfaces of the polyvinyl chloride substrates. There was then added to another portion of this printing ink composition, 0.6 weight part of ammonium carbonate in 10 weight parts of water and 1.0 weight part of glycerine, and this ink was then printed on the pool liner. After curing 1 minute at 82° C., the printed liner was sealed to another sample of the coated liner stock via dielectric heating. Another mixture containing 0.6 weight part of glycerine and 1.0 weight part of ammonium carbonate did not seal when dielectrically heated. When the Example was repeated with 3 weight parts of ammonium carbonate and 3 weight parts of glycerine the mixture gelled and could not be used.

EXAMPLE II

A series of clear dielectrically heat sealable coating mixtures were prepared by the general procedure of Example I by mixing 240 weight parts of the same acrylate polymer dispersion, after neutralization, with 10 weight parts of silica, 15 weight parts of water, 24 weight parts of ethylene glycol monobutyl ether, 27 grams of water and 4.3 weight parts of Acrysol TT-678. The viscosity of the mixture was 37 seconds on a Zahn cup #3. A sample of this composition coated on a pad printer was applied to a pool liner stock, baked and dielectrically heated. No seal was obtained between the coating and the liner. To another mixture there was added 0.1 weight part of ammonium carbonate and 1.0 weight part of glycerine, mixed into the coating composition. This mixture was then coated on a pad printer and applied to the pool liner stock and heated in the dielectric oven under the same conditions as used in the control sample. An excellent bond was obtained between the clear coating and the pool liner surface. When this Example was repeated with 0.2 weight parts of ammonium chloride in place of the ammonium carbonate, and with 2.0 weight parts of glycerine, a seal was obtained under dielectric heat.

The novel and improved coatings of this invention have many applications where dielectric heating of applied coating is desired. They are particularly applicable to vinyl halide polymer applications such as poly(vinylchloride) and copolymers of vinyl chloride. Representative products are automobile seating and side panels, furniture upholstery, swimming pool liners, specialty articles such as tote bags and crib mattresses, and the like. The coating compositions find particular utility in coating polymer films of from about 4 to about 30 mils thickness with printing inks and colored, decorative and protective coatings.

I claim:

1. A dielectric heat sealable coating composition comprising a water dispersion of an acrylate polymer comprising less than 10 weight percent of an olefinically unsaturated carboxylic acid and greater than 60 weight percent of acrylate esters of the formula

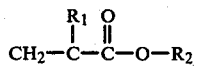

wherein $R_1$ is hydrogen, methyl or ethyl, and $R_2$ is an alkyl group containing 1 to 30 carbon atoms copolymerized together, an ammonium salt and glycerine.

2. A composition of claim 1 wherein said polymer is a vinyl chloride polymer, said acid is an $\alpha$, $\beta$-olefinically unsaturated carboxylic acid, and in the acrylate ester, $R_2$ contains 1 to 20 carbon atoms.

3. A composition of claim 2 wherein said acid is acrylic acid and said acrylate ester is a mixture of esters wherein $R_1$ is hydrogen and/or methyl.

4. A composition of claim 3 wherein said ammonium salt is present in amounts of about 0.05 to less than three weight parts per 100 weight parts of said acrylate polymer, and said glycerine is present in a ratio of about 2 to 1 to about 2 to 1 to said ammonium salt.

5. A composition of claim 4 wherein said acrylate polymers comprise about 20 to 50 weight percent ethyl acrylate or butyl acrylate and about 40 to 70 weight percent methyl methacrylate with less than 5 weight percent acrylic acid, said ammonium salt is present in amounts of about 0.05 to about one weight part and the ratio of glycerine to ammonium salt is from about 5 to 1 to about 15 to one.

6. A composition of claim 5 wherein said ammonium salt is ammonium chloride or ammonium carbonate, and the ratio of glycerine to said ammonium salt is about 10 to 1.